(12) United States Patent
Marschall et al.

(10) Patent No.: US 7,945,445 B1
(45) Date of Patent: May 17, 2011

(54) HYBRID LEXICON FOR SPEECH RECOGNITION

(75) Inventors: Erwin Marschall, Garmisch-Partenkirchen (DE); Meinrad Niemoeller, Holzkirchen (DE); Ralph Wilhelm, Munich (DE)

(73) Assignee: SVOX AG, Zurich (CH)

( * ) Notice: Subject to any disclaimer, the term of this patent is extended or adjusted under 35 U.S.C. 154(b) by 1096 days.

(21) Appl. No.: 10/333,114

(22) PCT Filed: Jul. 4, 2001

(86) PCT No.: PCT/DE01/02472
§ 371 (c)(1),
(2), (4) Date: Jan. 14, 2003

(87) PCT Pub. No.: WO02/07147
PCT Pub. Date: Jan. 24, 2002

(30) Foreign Application Priority Data

Jul. 14, 2000 (DE) .................................. 100 34 235

(51) Int. Cl.
*G10L 15/04* (2006.01)
*G10L 15/28* (2006.01)
(52) U.S. Cl. ..................... 704/251; 704/254; 704/255
(58) Field of Classification Search .................. 704/254, 704/251, 255
See application file for complete search history.

(56) References Cited

U.S. PATENT DOCUMENTS

| | | | | |
|---|---|---|---|---|
| 5,195,167 A | * | 3/1993 | Bahl et al. ..................... | 704/200 |
| 5,315,689 A | | 5/1994 | Kanazawa et al. | |
| 5,425,129 A | * | 6/1995 | Garman et al. ................ | 704/256 |
| 5,440,662 A | * | 8/1995 | Sukkar .......................... | 704/236 |
| 5,502,790 A | * | 3/1996 | Yi .................................. | 704/256 |
| 5,555,344 A | * | 9/1996 | Zunkler ......................... | 704/242 |
| 5,623,578 A | * | 4/1997 | Mikkilineni .................. | 704/255 |
| 5,679,001 A | * | 10/1997 | Russell et al. ................ | 434/185 |
| 5,754,972 A | * | 5/1998 | Baker et al. ................... | 704/200 |
| 5,825,977 A | * | 10/1998 | Morin et al. .................. | 704/255 |
| 5,848,389 A | * | 12/1998 | Asano et al. .................. | 704/239 |
| 5,899,971 A | * | 5/1999 | De Vos .......................... | 704/231 |
| 6,076,056 A | | 6/2000 | Huang et al. | |

(Continued)

FOREIGN PATENT DOCUMENTS

DE      689 14 032 T2      7/1994

OTHER PUBLICATIONS

R.E. Donovan, M. Franz, J.S. Sorensen, S. Roukos, "Phrase Splicing and Variable Substitution Using the IBM Trainable Speech Synthesis System", 1999, IEEE.*

(Continued)

*Primary Examiner* — Eric Yen
(74) *Attorney, Agent, or Firm* — King & Spalding L.L.P.

(57) ABSTRACT

Methods and apparatus for speech recognition based on a hidden Markov model are disclosed. A disclosed method of speech recognition is based on a hidden Markov model in which words to be recognized are modeled as chains of states and trained using predefined speech data material. Known vocabulary is divided into first and second partial vocabularies where the first partial vocabulary is trained and transcribed using a whole word model and the second partial vocabulary is trained and transcribed using a phoneme-based model in order to obtain a mixed hidden Markov model. The transcriptions from the two models are stored in a single pronunciation lexicon and the mixed hidden Markov model stored in a singe search space. Apparatus are disclosed that also employ a hidden Markov model.

8 Claims, 1 Drawing Sheet

U.S. PATENT DOCUMENTS

| | | | |
|---|---|---|---|
| 6,138,095 A * | 10/2000 | Gupta et al. | 704/234 |
| 6,173,266 B1 * | 1/2001 | Marx et al. | 704/270 |
| 6,260,014 B1 * | 7/2001 | Bahl et al. | 704/254 |
| 6,810,376 B1 * | 10/2004 | Guan et al. | 704/9 |
| 6,839,670 B1 * | 1/2005 | Stammler et al. | 704/251 |
| 7,127,397 B2 * | 10/2006 | Case | 704/260 |
| 2003/0130847 A1 * | 7/2003 | Case | 704/260 |

OTHER PUBLICATIONS

Takeshi Matsumura, et al., "Non-uniform unit based HMMs for continuous speech recognition", Feb. 15, 1995, pp. 321-329.

* cited by examiner

HYBRID LEXICON FOR SPEECH RECOGNITION

BACKGROUND

The present invention relates to methods of speech recognition based on a hidden Markov model and to corresponding voice recognizers.

Speech recognition systems are becoming increasingly widespread in various technical fields and also in private use, including the processing of orders over the telephone and the processing of other kinds of customer services over the telephone in banks, dispatching businesses, etc., in speech-controlled text processing in offices and for private use, and in the speech-actuated control of technical equipment of all types.

An effective and flexible adaptation to speakers, i.e., a high degree of precision recognition of words and sentences which are spoken by different speakers, is of essential significance for the practical use of speech recognition systems. Speech recognition systems for the commercial applications mentioned above are subject to particularly stringent requirements in this respect as it is not possible to train them to one speaker or to a small number of speakers but instead the system must process the speech inputs of a large number of speakers with a wide variety of speech properties and linguistic idiosyncrasies with maximum reliability.

Speech recognition systems based on hidden Markov models (HMM) in which the words to be recognized are modeled as chains of states and trained with predefined speech data material are known. Here, two basically different procedures can be put into practice:

In whole word models, words are modeled by states which correspond to parts of a specific word and only apply to the respective word. This modeling supplies good recognition results but can, however, only recognize words that were also a component of the speech data material used in the training process. Moreover, this method of modeling is only suitable for small vocabularies, since it becomes too costly in terms of processing for relatively large vocabularies and, thus, also too slow. Whole word models are usually used in applications where only numbers or chains of numbers are to be recognized.

In phoneme-based models, the words are modeled by means of states which correspond to phonemes or parts of phonemes. This modeling is independent of the specific vocabulary of the speech data material so that any desired additional words can be added to the speech recognizer during later practical use. However, this advantage is gained at the cost of a lower degree of recognition precision.

Nevertheless, in speech recognition systems that have to cope with large vocabularies which can be expanded in a flexible way these phoneme-based models are used exclusively.

SUMMARY

According to an example of the present invention, a method of speech recognition is provided that is based on a hidden Markov model in which words to be recognized are modeled as chains of states and trained using predefined speech data material. The method includes dividing known vocabulary into a first partial vocabulary of important and/or interchangeable words in a second partial vocabulary of other words. Additionally, training and transcribing of the first partial vocabulary using a whole word model is included as well as training and transcribing the second partial vocabulary using a phoneme-based model in order to obtain a corresponding mixed hidden Markov model. The transcriptions that are acquired from the two models are stored in a single pronunciation lexicon and the mixed hidden Markov model is stored in a single search space.

According to another example of the present invention a speech recognizer is provided for carrying out speech recognition based on a hidden Markov model in which words to be recognized or modeled as chains of states and trained using predefined speech data material. The speech recognizer includes a model memory for storing the hidden Markov model, a vocabulary memory, a training processing unit having an input connected to the vocabulary memory and configured to implement the hidden Markov model and a lexicon memory connected to an output of the training processing unit and configured to store a pronunciation lexicon. Additionally, the vocabulary memory has first and second memory areas that are capable of being accessed separately for storing first and second partial vocabularies. The model memory stores a mixed hidden Markov model comprising a whole word model and a phoneme-based model. In addition, the training processing unit has first and second sub-processing units, the first sub-processing unit being connected to the first memory area the vocabulary memory and configured to train the first partial vocabulary stored therein by implementing the whole word model. The second sub-processing unit is connected to the second memory area of the vocabulary memory and configured to train the second partial vocabulary by implementing the phoneme-based model.

BRIEF DESCRIPTION OF THE DRAWINGS

The various objects, advantages and novel features of the present disclosure will be more readily apprehended from the following Detailed Description when read in conjunction with the enclosed drawing, in which.

DETAILED DESCRIPTION OF THE PRESENT EXAMPLES

Figure 1:
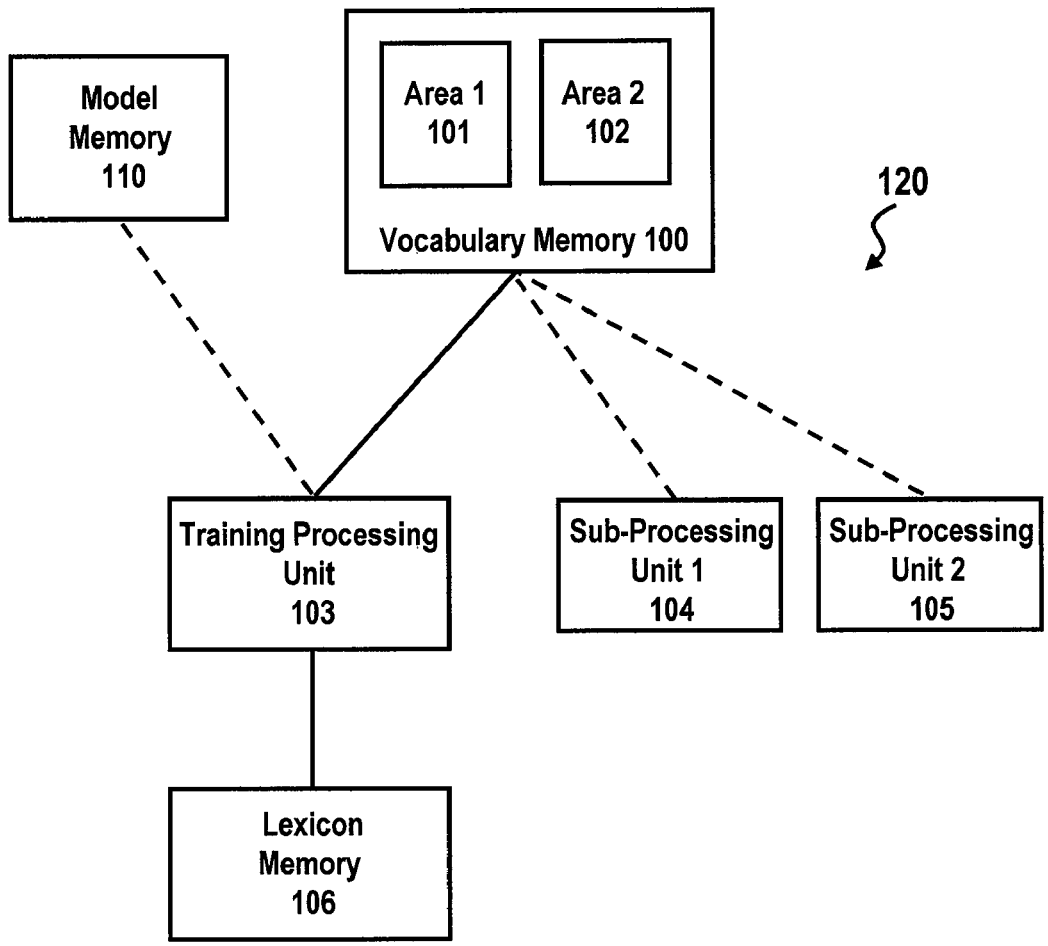
FIG. 1 is a speech recognizer under an exemplary embodiment of the invention.

In a disclosed method, vocabulary that is already known is firstly analyzed. Here, easily interchangeable and/or particularly important words are identified and assigned to a first partial vocabulary. For these specific words, whole word models are then trained within the scope of a uniform HMM search space, and corresponding transcriptions are made in the pronunciation lexicon. For the other words (in the same context), a phoneme-based model is trained and the pronunciation lexicon is supplemented with corresponding entries and the mixed HMM is stored in the (single) search space.

In an example of the present invention, two modeling methods are combined for selected words of the vocabulary, in particular for those words of the first partial vocabulary which are particularly important and/or interchangeable. By means of a specific modeling of, for example, numerals, by means of whole word models from pronunciation variants to form the phoneme-based modeling of the corresponding words, significantly higher recognition rates are achieved for the important word. Nevertheless, such a mixed model is flexible because it can be expanded to new words not contained in the training material using the method of phoneme-based modeling.

The proposed solution thus surprisingly combines the advantages of high recognition quality (of whole word modeling) and high flexibility (of the phoneme-based modeling), which previously seemed incapable of being combined, in a single method or speech recognizer.

The proposed speech recognizer 120 is defined by a division of the vocabulary memory 100 into a first and second memory area (101, 102) for the aforesaid first and second partial vocabulary and the example of the training processing unit 103 with two relatively independent components (104, 105), in one of which a whole word model is implemented and in the other of which a phoneme-based model is implemented. In an example, which has already been mentioned in terms of carrying out the method in an advantageous way, the second component (sub-processing unit 105) can also access the memory area of the vocabulary memory in which the partial vocabulary that is to be processed (primarily) by the first component (sub-processing unit 104) is stored.

As a result of parallel processing by both components, transcriptions can therefore be acquired as pronunciation variants of one and the same word. The lexicon memory 106 for storing the pronunciation lexicon is organized in this example in such a way that the aforementioned pronunciation variants can be stored for the individual words—at least of the one partial vocabulary.

Thus, in phoneme-based modeling the word (microphone) is stored with the transcription "m ī k r Əf ō n" in a pronunciation lexicon. A running time system of an HMM speech recognizer then uses the chain of phonemes "m"—"ī"-"k" . . . " by decomposing these phonemes into further subunits (segments) and entering a corresponding sequence of HMM states in the search space. This procedure corresponds to that of a word from the above mentioned second partial recovery by means of phoneme-based modeling.

The numeral "one" as a particularly important word is handled differently in the disclosed solution. Instead of, or as a supplement to, a transcription acquired by means of phoneme-based modeling, for example a transcription "one: 0 one:1 one:2 one:3 one:4 one:5" is noted in the pronunciation lexicon. The parts "one:0", "one:1", . . . do not stand here for phonemes but rather for a total of six sections of the word "one". A running time system of an HMM speech recognizer will then in turn decompose this chain of parts of words into subunits (segments) and add a corresponding sequence of HMM states to the search space. The aforementioned procedure corresponds to that of a word from the first partial vocabulary using whole word modeling.

A further variant consists in handling the individual parts of words of compound words differently. For example, the German word "zweimal" will be transcribed as "zwei:0 zwei:1 zwei:2 zwei:3 mal"; the first part of the word "zwei" is therefore handled with whole word modeling while the second part of the word "mal" is trained in a phoneme-based fashion.

One practical application area of the proposed method is a speech recognition system which is used in processing returned merchandize in a mail order goods business where, despite extremely high noise levels in a "works" building, there is a particular requirement for a very high degree of precision in the recognition of numbers. In addition, flexibility in terms of recognition of words added by the respective customer is essential. For this application, the speech recognition method provides for phoneme-based modeling of the entire vocabulary to be supplemented with whole word modeling of the numerals. All the numerals are, therefore, entered in the search space both as phoneme-based and as whole word models.

A further interesting application is the implementation of tools for generating knowledge sources for voice recognizers, i.e. as an option for what is referred to as "vocabulary design".

Hence, the present invention provides an improved method and a speech recognizer of the generic type that is defined, in particular, by a satisfactory recognition precision with simultaneous flexibility, i.e., the possibility of expanding the vocabulary.

The present invention also includes the concept of combining the two above-mentioned concepts of the whole word modeling and phoneme-based modeling. It also includes the idea of subjecting a given vocabulary to a classification distinguishing which components of the vocabulary are preferably to be subjected to the whole word modeling, and which to the phoneme-based modeling. Finally, it includes the idea or recording the training results in a common pronunciation lexicon.

Although certain examples of methods and apparatus in accordance with the teachings of the invention have been described herein, the scope of coverage of this patent is not limited thereto. On the contrary, this patent covers all embodiments of the teachings of the present invention fairly falling within the scope of the appended claims, either literally or under the doctrine of equivalents.

What is claimed is:

1. A method of speech recognition based on a hidden Markov model in which a word to be recognized is modeled as a chain of states and trained using predefined speech data material, the method comprising:

dividing a known vocabulary into a first partial vocabulary of words and a second partial vocabulary of other words, wherein for the first partial vocabulary, only at least one of easily interchangeable words and important words are identified and assigned to the first partial vocabulary and wherein the other words of said known vocabulary are only assigned to the second partial vocabulary and trained using a phoneme-based model;

training and transcribing the words of the first partial vocabulary using a whole word model wherein each word of the first partial vocabulary is modeled by a chain of states by dividing each word into a plurality of sections which only apply to the respective word;

transcribing the sections of each word of the first partial vocabulary with a word identifier and an index and transcribing the second partial vocabulary using the phoneme-based model, wherein the words are modeled by means of states that correspond to phonemes or parts of phonemes, in order to obtain a corresponding mixed hidden Markov model by storing the first partial vocabulary in the form of word identifiers with indices and the second partial vocabulary in the form of phonetic transcriptions in a single pronunciation lexicon; and storing the mixed hidden Markov model in a single search space, wherein the states of the phoneme-based model correspond to phonemes or parts of phonemes and are used in a plurality of words and the states of the whole word model only apply to the respective word.

2. The method as defined in claim 1, wherein the first partial vocabulary comprises numerals and/or control instruction words.

3. The method according to claim 1, wherein the step of dividing is performed during a speech recognition training.

4. The method according to claim 3, wherein said second partial vocabulary can be expanded to include new words not contained in said speech recognition training.

5. A speech recognizer for carrying out speech recognition based on a hidden Markov model in which a word to be recognized is modeled as a chain of states and trained using predefined speech data material, the speech recognizer comprising:

a model memory for storing the hidden Markov model;

a vocabulary memory having a first and second memory area, wherein both memory areas respectively store a first and second partial vocabulary, wherein the first partial vocabulary only comprises numerals and/or control instruction words which have been identified from a known vocabulary and wherein remaining words from said known vocabulary are only assigned to the second partial vocabulary and trained using the phoneme-based model;

a training processing unit comprising a first and second sub-processing units, wherein the training processing unit has an input connected to the vocabulary memory and is configured to implement the hidden Markov model; and a lexicon memory containing a pronunciation lexicon that is connected to an output of the training processing unit, wherein the first sub-processing unit communicates with the first memory area of the vocabulary memory to train and transcribe the words of the first partial vocabulary stored therein by implementing a whole word model where each word of the first partial vocabulary is modeled by a chain of states by dividing each word into a plurality of sections which only apply to the respective word and the sections of each word of the first partial vocabulary are transcribed with a word identifier and an index, and wherein the second sub-processing unit communicates with the second memory area of the vocabulary memory to transcribe the second partial vocabulary by implementing a phoneme-based model, where the words are modeled by means of states that correspond to phonemes or parts of phonemes, to obtain a corresponding mixed hidden Markov model, and wherein the lexicon memory stores the first partial vocabulary in the form of word identifiers with indices and the second partial vocabulary in the form of phonetic transcriptions in a single pronunciation lexicon, and stores the mixed hidden Markov model in a single search space, wherein the states of the phoneme-based model correspond to phonemes or parts of phonemes and are used in a plurality of words and the states of the whole word model only apply to the respective word.

6. A method of speech recognition based on a hidden Markov model in which a compound word to be recognized is partially modeled as a chain of states and trained using predefined speech data material, the method comprising:

dividing a known vocabulary into a first partial vocabulary of words and a second partial vocabulary of other words, wherein both the first and second partial vocabulary are related to the compound word, wherein from the known vocabulary only numerals and/or control instruction words are identified and assigned to the first partial vocabulary and wherein the other words of said known vocabulary are only assigned to the second partial vocabulary and trained using the phoneme-based model;

training and transcribing the first partial vocabulary using a whole word model for one part of the compound word where each word of the first partial vocabulary is modeled by a chain of states by dividing each word into a plurality of sections which only apply to the respective word;

transcribing the sections of each word of the first partial vocabulary with a word identifier and an index and transcribing the second partial vocabulary using phoneme-based modeling for another part of the compound word, where the words are modeled by means of states that correspond to phonemes or parts of phonemes, in order to obtain a corresponding mixed hidden Markov model by storing the first partial vocabulary in the form of word identifiers with indices and the second partial vocabulary in the form of phonetic transcriptions that are acquired from the two models in a single pronunciation lexicon;

storing the mixed hidden Markov model in a single search space where the states of the phoneme-based model correspond to phonemes or parts of phonemes and are used in a plurality of words and the states of the whole word model only apply to the respective word.

7. The method according to claim 6, wherein the step of dividing is performed during a speech recognition training.

8. The method according to claim 7, wherein said second partial vocabulary can be expanded to include new words not contained in said speech recognition training.

* * * * *